United States Patent
Iavarone

(12) 
(10) Patent No.: US 6,274,814 B1
(45) Date of Patent: Aug. 14, 2001

(54) DECORATIVE CONDUIT RACEWAY COVERING

(76) Inventor: Steven Iavarone, 30 Washington Ave., Holtsville, NY (US) 11742

( * ) Notice: Subject to any disclaimer, the term of this patent is extended or adjusted under 35 U.S.C. 154(b) by 0 days.

(21) Appl. No.: 09/436,178

(22) Filed: Nov. 8, 1999

(51) Int. Cl.$^7$ .................................................. H02G 3/04
(52) U.S. Cl. ............................ 174/68.3; 174/38; 174/48; 174/72 C; 174/100; 174/101; 52/287.1; 52/288.1
(58) Field of Search ................................. 174/38, 48, 49, 174/68.3, 72 C, 95, 96, 99 R, 100, 101; 52/287.1, 288.1

(56) References Cited

U.S. PATENT DOCUMENTS

| | | | |
|---|---|---|---|
| D. 399,190 | * 10/1998 | Dale et al. ........................ | D13/184 |
| 1,590,569 | * 6/1926 | Fisk ................................. | 174/68.3 |
| 2,956,587 | * 10/1960 | Fisher .............................. | 138/75 |
| 3,025,432 | * 3/1962 | Giegerich ......................... | 317/99 |
| 3,171,702 | * 3/1965 | Schumacher et al. ............ | 339/22 |
| 3,562,402 | * 2/1971 | Dwyer et al. .................... | 174/35 |
| 3,855,413 | 12/1974 | Sevier .............................. | 174/48 |
| 3,971,184 | * 7/1976 | Van Wagoner ................... | 52/173 |
| 4,077,434 | * 3/1978 | Sieckert et al. .................. | 138/92 |
| 4,294,189 | 10/1981 | Ashida ............................. | 118/603 |
| 4,348,548 | 9/1982 | Grundfest ........................ | 174/88 R |
| 4,391,661 | 7/1983 | Izraeli ............................. | 156/49 |
| 4,511,611 | 4/1985 | Moisson .......................... | 428/35 |
| 4,611,656 | 9/1986 | Kendall, Jr. et al. ............ | 166/65.1 |
| 4,864,467 | * 9/1989 | Byrd et al. ....................... | 361/369 |
| 5,286,922 | 2/1994 | Curtiss ............................ | 174/112 |
| 5,304,736 | * 4/1994 | Halfacre .......................... | 174/48 |
| 5,367,122 | 11/1994 | de Olano ......................... | 174/48 |
| 5,962,809 | * 10/1999 | Duvall et al. ................... | 174/37 |
| 5,986,212 | * 11/1999 | Lhota .............................. | 174/68.3 |

* cited by examiner

Primary Examiner—Dean A. Reichard
Assistant Examiner—Adolfo Nino
(74) Attorney, Agent, or Firm—Michael I. Kroll

(57) ABSTRACT

The present invention 10 discloses a means for decoratively concealing electrical cabling or conduit 15 on a building structure 12. Disclosed are U-shaped channel section members 16 being joined together by U-shaped connection members 20 for attachment to the exterior of the building siding 14. Also shown is a meter cover 18 having flanges 45 with fastener apertures 38 therein for attachment over the building electrical meter further having viewing apertures 44 therein for viewing the electrical meter and lock member. The channel members 16 are attached to the building 12 by U-shaped clips 22 having means for attachment 36 of the channels 16 and fastener apertures 38 for attachment to the building 12. A top cap 24 and end cap 30 are provided to seal the channel members 16 from outside dust and debris.

15 Claims, 18 Drawing Sheets

SIDE VIEW

DECORATIVE CONDUIT RACEWAY COVERING

BACKGROUND OF THE INVENTION

This case is subject to Disclosure Document number 397148.

FIELD OF THE INVENTION

The present invention relates generally to electrical cabling and, more specifically, to a means for decoratively concealing electrical cabling from the point of contact with a structure until passing within said structure including the electric meter. In the preferred embodiment of the present invention the decorative concealment of the electrical cabling and the electric meter is more aptly suited to those structures having aluminum or vinyl siding regardless of whether the cabling or conduit was laid over the siding or the siding was terminated along the periphery sides of the cable or electric conduit raceway. Furthermore, the present invention is designed to function whether the siding is installed in a vertical or horizontal fashion regardless of the width of the siding members.

Besides the aesthetic value of the present invention there is also the intangible benefits of protecting the cables and electrical meter from adverse conditions. Whether it be dust, rain, or snow, all of these contribute to the shortened life expectancy of the equipment. Which in the case of electrical meters can be a substantial investment which any homeowner would be happy to postpone for 10 to 20 years.

The present invention is comprised of U-shaped channel members which selectively cover the cable or cable conduit and a housing member which is placed over the electric meter, having a first aperture therein for viewing the meter and a second aperture for inspecting the meter lock for tampering. There is also provided U-shaped connecting members for joining two channel members and angle connecting members for changing the direction of the channel run.

A plurality of U-shaped clips are selectively positioned on the siding and affixed by means of an adhesive backing and/or fastening members whereupon the channel members are snapped into the clip leg members of the U-shaped clips. Said U-shaped clips can be formed with a number of protrusions causing the siding face of the clip to conform to the greater tilt of the siding whereupon attachment of the channel members will engage the clip leg members without deforming the siding. Additional clip members have a stepped-like backing conforming to the contour of joined siding members.

DESCRIPTION OF THE PRIOR ART

There are other electric cable sleeve devices designed to address various shortcomings in electrical cabling especially concerning the exterior installation of said cabling. Typical of these is U.S. Pat. No. 5,367,122 issued to deOlano on Nov. 22, 1994.

Another patent was issued to Baillie on Dec. 17, 1974 as U.S. Pat. No. 3,855,413. Yet another U.S. Pat. No. 5,286,922 was issued to Curtiss on Feb. 15, 1994 and still yet another was issued on Jul. 5, 1983 to Izaeli as U.S. Pat. No. 4,391,661.

Another patent was issued to Ashida et al. on Oct. 13, 1981 as U.S. Pat. No. 4,294,189. Yet another U.S. Pat. No. 4,511,611 was issued to Moisson on Apr. 16, 1985. Another was issued to Kendall, Jr. et al on Sep. 16, 1986 as U.S. Pat. No. 4,611,656 and still yet another was issued on Sep. 7, 1982 to Grundfest as U.S. Pat. No. 4,348,548.

U.S. Pat. No. 5,367,122

Inventor: Luis A. R. deOlano

Issued: Nov. 22, 1994

An ornamental electrical molding comprising a body made up of flexible and moldable insulating material, where tubular conductors made up of helically wound wire are located. The molding is covered on its bottom face by a plastic foam strip coated with contact adhesive, and permits—together with a set of fittings assembled to each other—the performance of exposed surface installations quickly, easily and decoratively. The body that houses the wire connector tubes has a double function, as insulator and as a frame for ornamental designs.

U.S. Pat. No. 3,855.413

Inventor: William R. Baillie

Issued: Dec. 17, 1974

A wire protector comprising a steel tube rolled from a flat sheet that has had a plurality of dimples formed adjacent one edge which will become an axial end of the tube. The tube is cylindrical and of an external diameter closely to fit a hole bored in a stud of a mobile home or recreational vehicle. The dimples protrude from the exterior and when the wire protector is hammered into the hole of the stud, the dimples grip the stud and additionally cause slight contraction of the tube forcing the seam tightly closed.

U.S. Pat. No. 5,286,922

Inventor: Thomas E. Curtiss

Issued: Feb. 15, 1994

An electrical conducting wire for providing high visibility. The conducting wire is coated with a conducting, colored paint which improves the wires visibility. The conducting wire can be used in electric fencing of live stock or high-tension power lines commonly seen around airports.

U.S. Pat. No. 4,391,661

Inventor: Hyman Izraeli

Issued: Jul. 5, 1983

In providing an electrically insulative covering for a cable splice, a sleeve is assembled with an outer rigid shell and is maintained in fluid-sealed relation therewith. A supply of positively pressurized air is placed with the assembled sleeve and outer member, in fluid sealed relation with the sleeve interior. The sleeve is expanded into contiguous relation with the outer member by the pressurized air. The expanded assembly is placed over the splice and the fluid sealed relation of sleeve and outer member is interrupted, causing the sleeve to collapse upon the splice and cables, whereupon the outer member is removed and discarded.

U.S. Pat. No. 4,294,189

Inventor: Hiroshi Ashida et al.

Issued: Oct. 13, 1981

An apparatus for coating vertically extending wires with paint in which the temperature of a paint bath is accurately maintained and temperature variations within the bath are largely eliminated so as to provide constant coating characteristics. Vertically extending coating chambers are provided having relatively small cross-sectional areas so that heat generated by an adjacent heating element is spread evenly throughout the paint bath. A coating die is disposed at the top of each chamber. A discharge element is provided near the coating die and a paint receiving pool is stationed to receive the paint discharged through the outlet. The paint pool is in fluid communication with the bottom portion of each of the chambers.

U.S. Pat. No. 4,511,611

Inventor: Marc F. L. Moisson

Issued: Apr. 16, 1985

The present invention relates to improved liner constructions, and accordingly provides a cable sleeve liner capable in use of being wrapped around a cable splice and preferably having sufficient rigidity to provide an inner support for a heat-recoverable sleeve to be shrunk thereover, the liner comprising a laminate having at least one layer of fibrous sheet material and a metal layer which is substantially impermeable to moisture vapor and has one of its major surfaces facing away from all fibrous sheet layers which may be present. Preferably the fibrous layer(s) is or are arranged between the metal layer and a microperforated first layer of flexible polymeric film material which is permeable to gases or vapors generated within the laminate during recovery of the sleeve.

U.S. Pat. No. 4,611,656

Inventor: Clarence E. Kendall, Jr. et al.

Issued: Sep. 16, 1986

A crush and abrasion resistant, sealed, impervious, flexible protective jacket assembly for oil and gas wells containing a plurality of electrical and/or fluid conductors that are oriented in linear, spaced, parallel relation. A pair of elongated protective metal sheets define elongated conductor grooves. The metal sheets are joined by welding to define a plurality of elongated chambers containing one or more of the conductors. The chambers are sealed from the atmosphere and may be filled with a non-gaseous dielectric material to prevent the development of corona discharge that might cause deterioration of the protective jacket assembly. The configuration of the sheets of protective material is such that the development of corona discharge is resisted. A pair of metal longitudinal structural elements are attached at opposed sides of the protective jacket assembly and prevent damage thereto by abrasion, crushing, bending, etc., and provide sufficient tensile strength so that the protective jacket assembly will support its entire length.

U.S. Pat. No. 4,348,548

Inventor: Michael A. Grundfest

Issued: Sep. 7, 1982

An insulator for covering an electric cable has circular recesses for receiving any portions of a connector which extend beyond a surface of the cable covered by the insulator. If the connector extends between overlapping portions of a pair of cables, the connector and the overlapping portions of the cable can be completely enveloped by sandwiching them between a pair of insulators. The diameter of each recess is chosen so as to closely accommodate the extending portions of its associated connector and to provide a substantial barrier of insulation about the connector out to the edges of the cables being joined to prevent moisture, dirt and other contaminants from reaching the connector and causing its degradation or shorting.

While these electric cable sleeve devices may be suitable for the purposes for which they were designed, they would not be as suitable for the purposes of the present invention, as hereinafter described.

SUMMARY OF THE PRESENT INVENTION

The present invention discloses a means for decoratively concealing electrical cabling or conduit to a building structure. Disclosed are U-shaped channel section members being joined together by U-shaped connection members for attachment to the exterior of the building siding. Also shown is a meter cover having flanges with fastener apertures therein for attachment over the building electrical meter further having viewing apertures therein for viewing the electrical meter and lock member. The channel members are attached to the building by U-shaped clips having means for attachment of the channels and fastener apertures for attachment to the building. A top cap and end cap are provided to seal the channel members from outside dust and debris.

A primary object of the present invention is to provide a decorative means for covering cable or conduit members attached to a structure.

Another object of the present invention is to provide protective means for cable and conduit members attached to a structure.

Yet another object of the present invention is to provide a decorative covering for cable or conduit comprising a plurality of bracketed holding members fixedly attached to a structure whereupon U-shaped channel members can be affixed thereto, an electric meter housing member having a centrally located frontal aperture for viewing said meter and a lower frontal aperture for viewing the lock of said meter, a pyramidacally shaped top cap with one open side for introducing the service into the conduit and a flat end cap with securing tabs to seal the conduit once the service enters the structure.

Additional objects of the present invention will appear as the description proceeds.

The present invention overcomes the shortcomings of the prior art by providing a means for decoratively concealing electrical cabling from a predetermined point of contact with a structure until passing within said structure including the electric meter. In the preferred embodiment of the present invention the decorative concealment of the electrical cabling and the meter service panel is more aptly suited to those structures having aluminum or vinyl siding regardless of whether the cabling or conduit was laid over the siding or the siding was terminated along the periphery sides of the cable or cable conduit raceway.

Furthermore, the present invention is designed to function whether the siding is installed in a vertical or horizontal fashion regardless of the width of the siding members.

The foregoing and other objects and advantages will appear from the description to follow. In the description reference is made to the accompanying drawings, which form a part hereof, and in which is shown by way of illustration specific embodiments in which the invention may be practiced. These embodiments will be described in sufficient detail to enable those skilled in the art to practice the invention, and it is to be understood that other embodiments may be utilized and that structural changes may be made without departing from the scope of the invention. In the accompanying drawings, like reference characters designate the same or similar parts throughout the several views.

The following detailed description is, therefore, not to be taken in a limiting sense, and the scope of the present invention is best defined by the appended claims.

BRIEF DESCRIPTION OF THE DRAWINGS

In order that the invention may be more fully understood, it will now be described, by way of example, with reference to the accompanying drawings in which.

LIST OF REFERENCE NUMERALS

Figure 1:
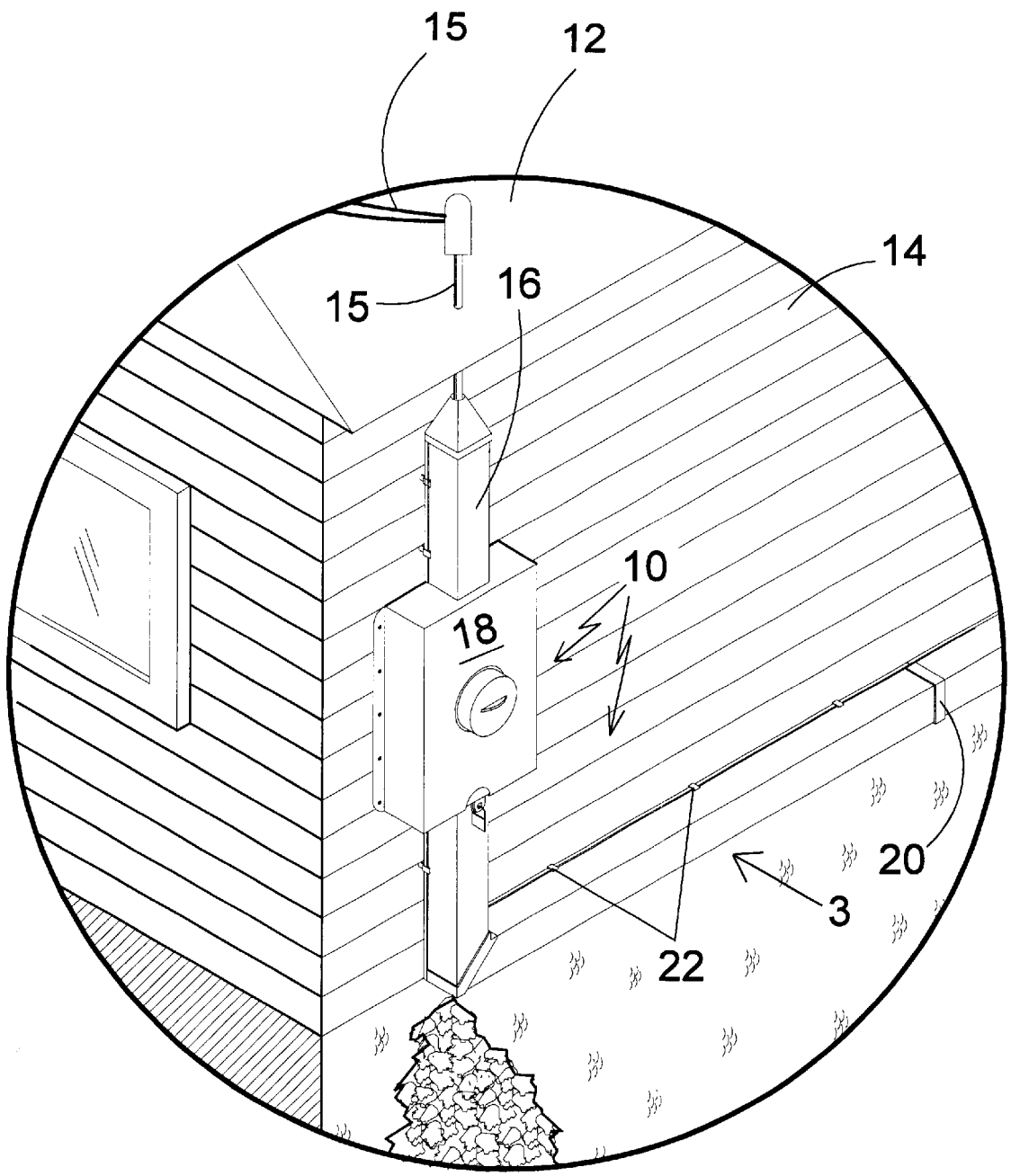
FIG. 1 is a perspective view of the present invention in use. Shown is a structure having vinyl siding whereupon is affixed a variable length of channel and an electric meter cover. The channel is joined by a plurality of connection members and is affixed to the structure by a plurality of U-shaped clips.

With regard to reference numerals used, the following numbering is used throughout the drawings.

10 present invention
12 structure 14 vinyl siding
15 electrical cabling or conduit
16 channel
18 electric meter cover
20 connection members
22 U-shaped clips
24 top cap
26 means for closing
28 sloping sides
30 end cap
32 means for closing
34 means for spacing
36 means for attachment
38 fastener apertures
40 clip engaging means
42 adhesive pad
44 viewing aperture
45 flange
46 angular end
48 means for joining
50 stepped siding engaging member
52 adhesive pad
54 shoulder

DESCRIPTION OF THE PREFERRED EMBODIMENT(S)

In order that the invention may be more fully understood, it will now be described, by way of example, with reference to the accompanying drawings in which FIGS. 1 through 15 illustrate the present invention being a decorative conduit raceway covering Turning to FIG. 1, shown therein is a perspective view of the present invention 10 in use. Shown is electrical cabling or conduit 15 on a structure 12 having siding 14, e.g., vinyl or the like, whereupon is affixed a variable length of channel 16 and an electric meter cover 18. The channel 16 is joined by a plurality of connection members 20 and is affixed to the structure by a plurality of U-shaped clips 22.

Figure 2:
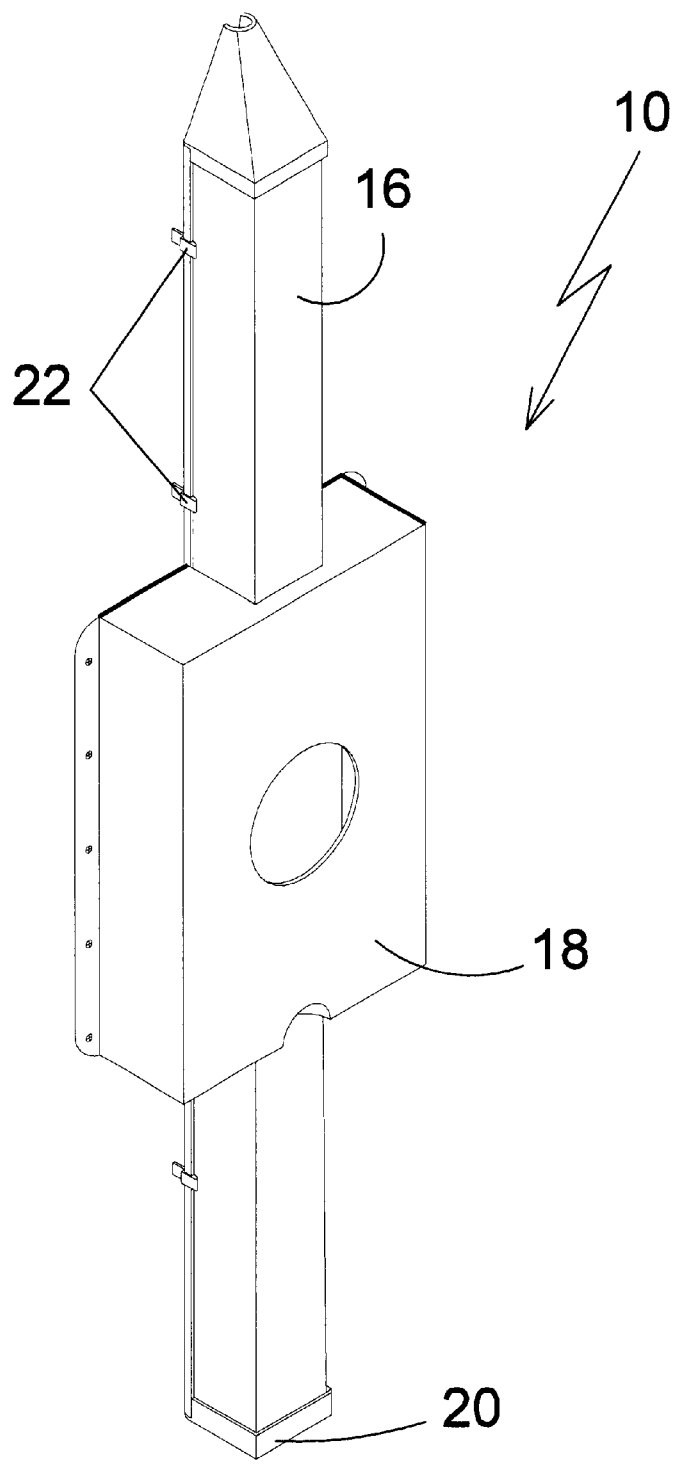
FIG. 2 is an enlarged view of the present invention. Shown is an assembled view of a variable length of channel and an electric meter cover. The channel is joined by a plurality of connection members and is affixed to the structure by a plurality of U-shaped clips.

Turning to FIG. 2, shown therein is an enlarged view of the present invention 10. Shown is an assembled view of a variable length of channel 16 and an electric meter cover 18. The channel 16 is joined by a plurality of connection members 20 and is affixed to the structure by a plurality of U-shaped clips 22.

Figure 3:
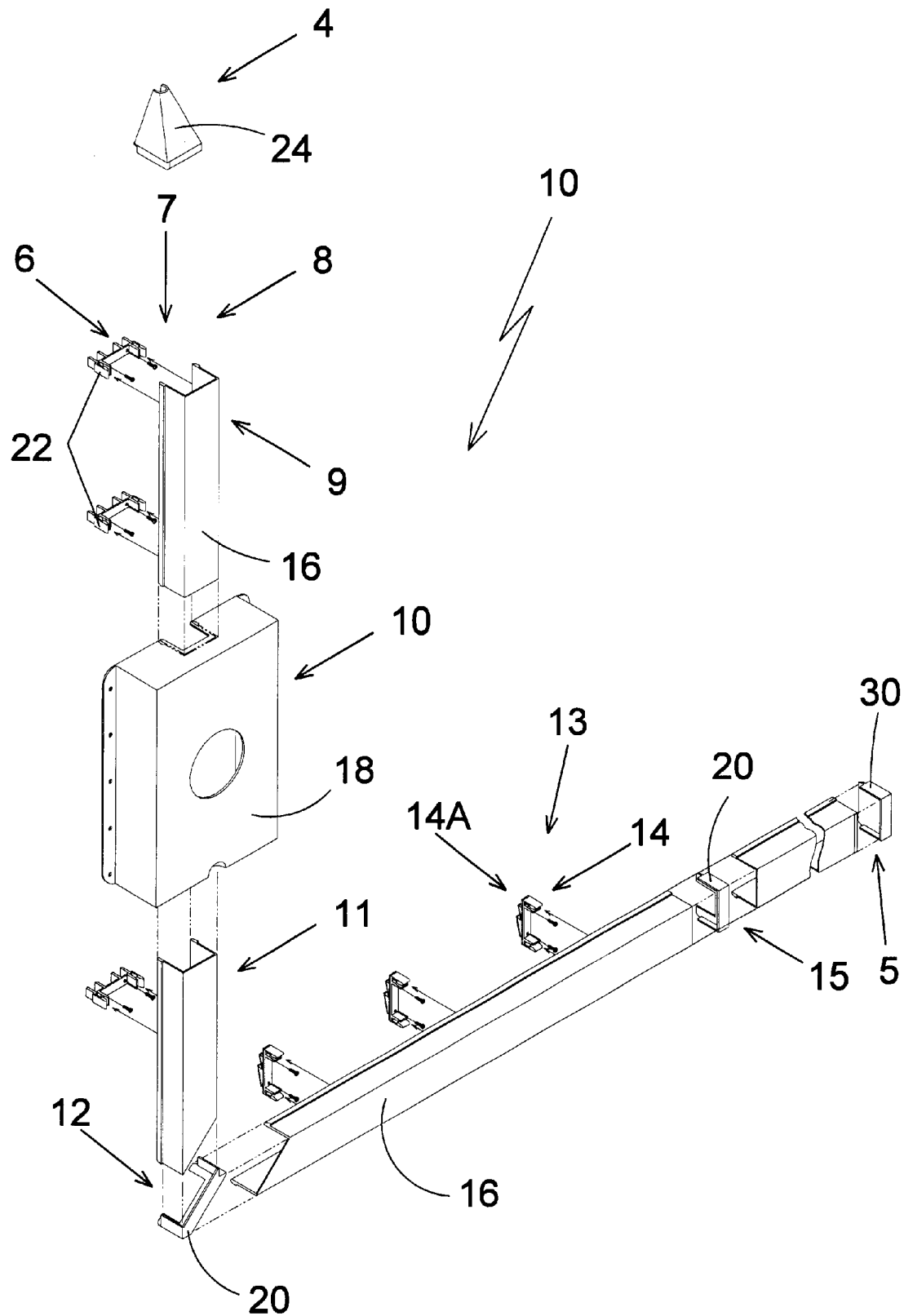
FIG. 3 is an exploded view of the components of the present invention. Shown are a plurality of channel members having a plurality of connection members and a plurality of structural engaging mounting members. Also shown is an electrical meter housing and a pyramid-shaped channel top cap.

Turning to FIG. 3, shown therein is an exploded view of the components of the present invention 10. Shown are a plurality of U-shaped channel members 16 having a plurality of U-shaped connection members 20 and a plurality of structural engaging mounting members 22. Also shown is an electrical meter housing 18 and a pyramid-shaped channel top cap 24 and end cap 30.

Figure 4:
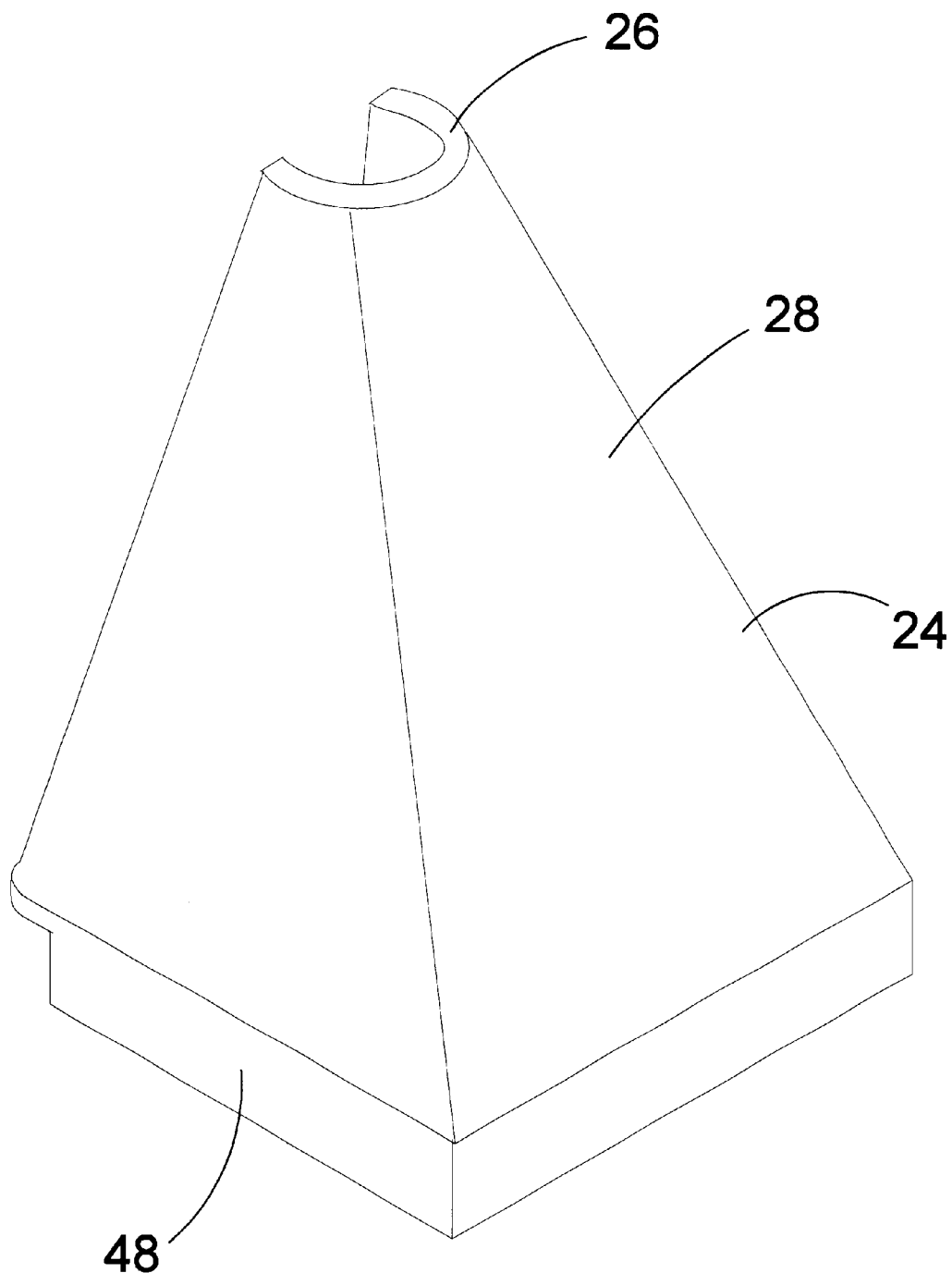
FIG. 4 is enlarged view, taken from FIG. 3 as indicated, showing the channel top cap having means for closing said member around cable or conduit and sloping sides therein allowing dirt, debris, rain, and snow to run-off.

Turning to FIG. 4, shown therein is an enlarged view, taken from FIG. 3 as indicated, showing the channel top cap 24 having means for closing 26 the member around cable or conduit and sloping sides 28 therein allowing dirt, debris, rain, and snow to run-off along with means for joining 48 to the channel members.

Figure 5:
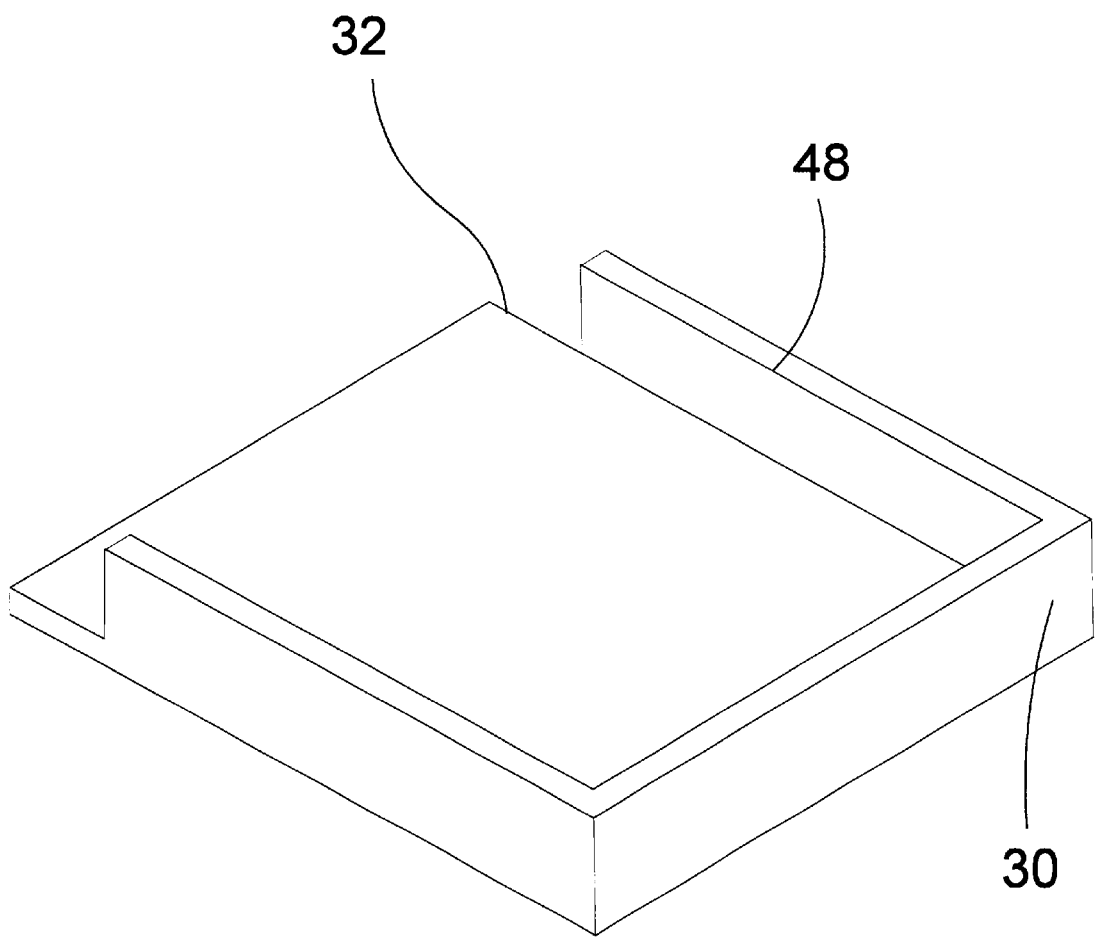
FIG. 5 is an enlarged view, taken from FIG. 3 as indicated, showing the channel end cap having means for closing said member around cable or conduit, therein sealing the channel from dirt, debris, rain, and snow.

Turning to FIG. 5, shown therein is an enlarged view, taken from FIG. 3 as indicated, showing the channel end cap 30 having means for closing 32 the member around cable or conduit, therein sealing the channel from dirt, debris, rain, and snow along with means for joining 48 to the channel members.

Figure 6:
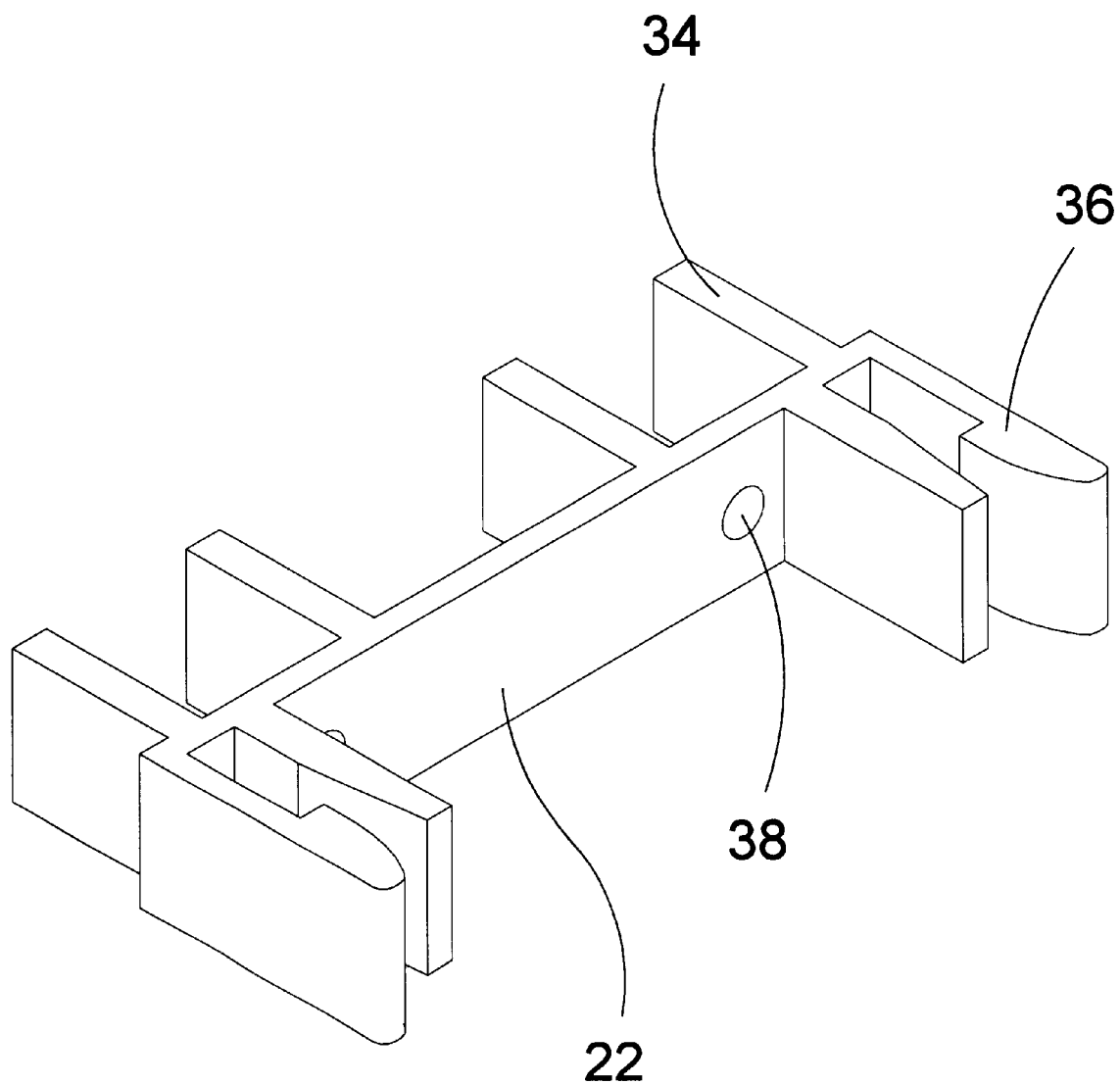
FIG. 6 perspective view of a mounting clip member, taken from FIG. 3 as indicated. Shown are means for holding the clip away from the siding and having means for holding the channel members. Also shown are fastener apertures for affixing said channel-holding clips to a structure.

Turning to FIG. 6, shown therein is a perspective view of a U-shaped mounting clip member 22, taken from FIG. 3 as indicated. Shown are means for spacing 34 the clip away from the siding and having means for attachment 36 of the channel members. Also shown are fastener apertures 38 for affixing said channel-holding clips 22 to a structure.

Figure 6A:
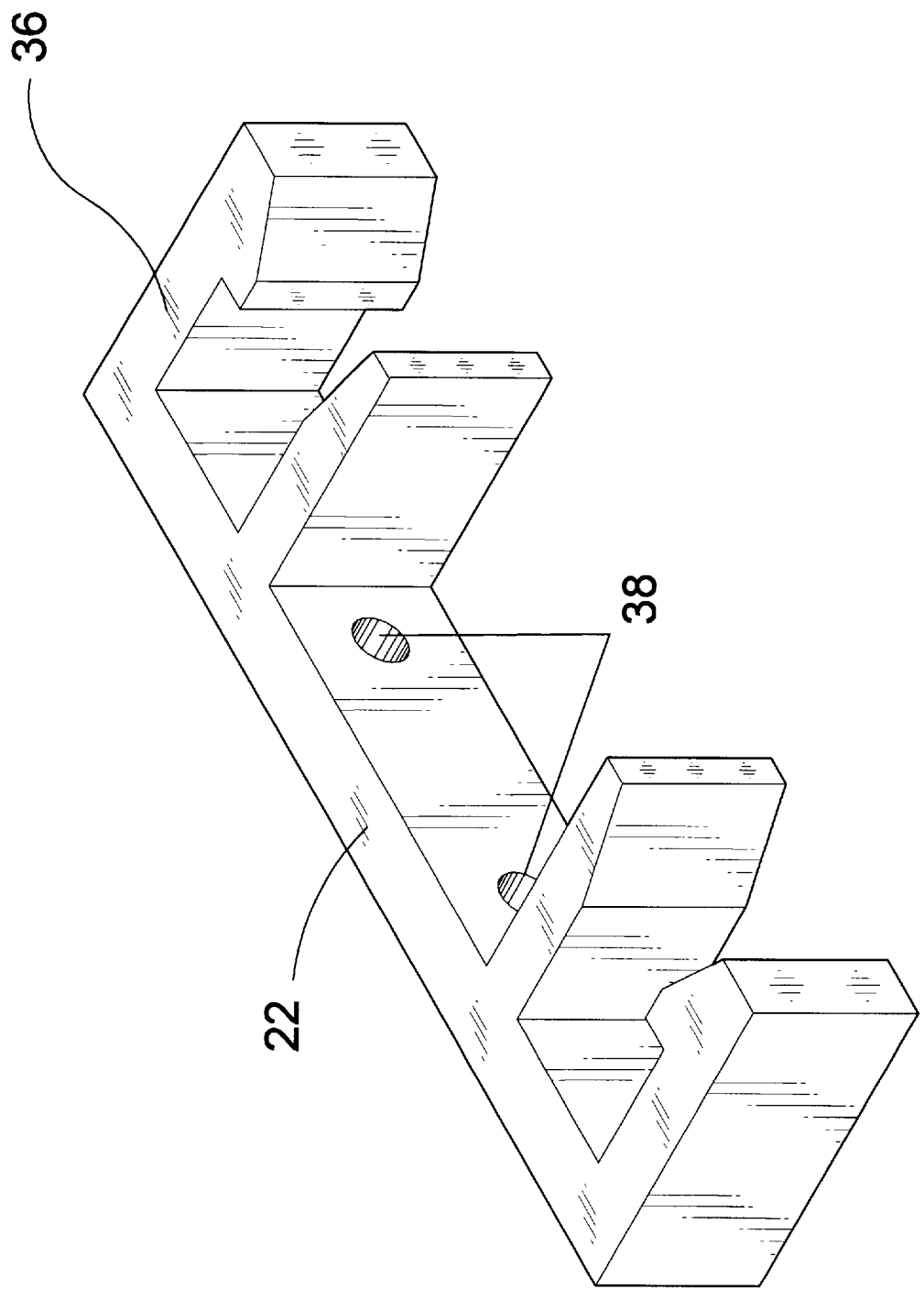
FIG. 6A is a perspective view of an alternate mounting clip member. Shown are means for holding the channel members. Also shown are fastener apertures for affixing said channel-holding clip to a structure.

Turning to FIG. 6A, shown therein is a perspective view of an alternate mounting clip member 22. Shown are means for attaching 36 the channel members. Also shown are fastener apertures 38 for affixing the channel holding clip 22 to a structure.

Figure 7:
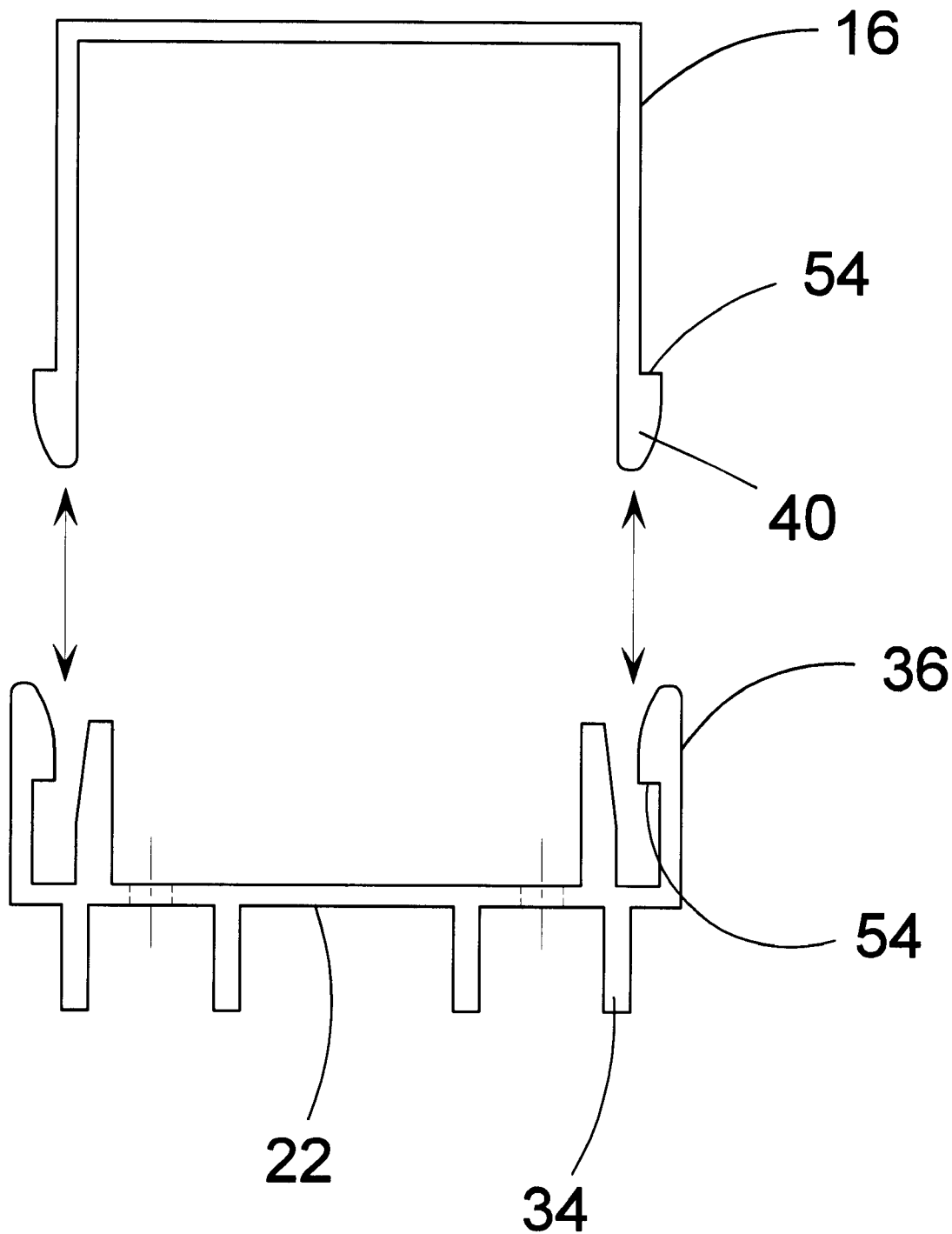
FIG. 7 is a top view, taken from FIG. 3 as indicated. Shown is a channel holding member having standoff members and clip members. Also shown is a channel member having clip-engaging means for securing the channel member to the clip-fastening member.

Turning to FIG. 7, shown therein is a top view, taken from FIG. 3 as indicated. Shown is a channel holding member 22 having standoff members 34 and clip members 36. Also shown is a channel member 16 having clip-engaging means 40 with a shoulder 54 thereon for securing the channel member 16 to the clip-fastening member 36 having a mating shoulder 54 thereon.

Figure 7A:
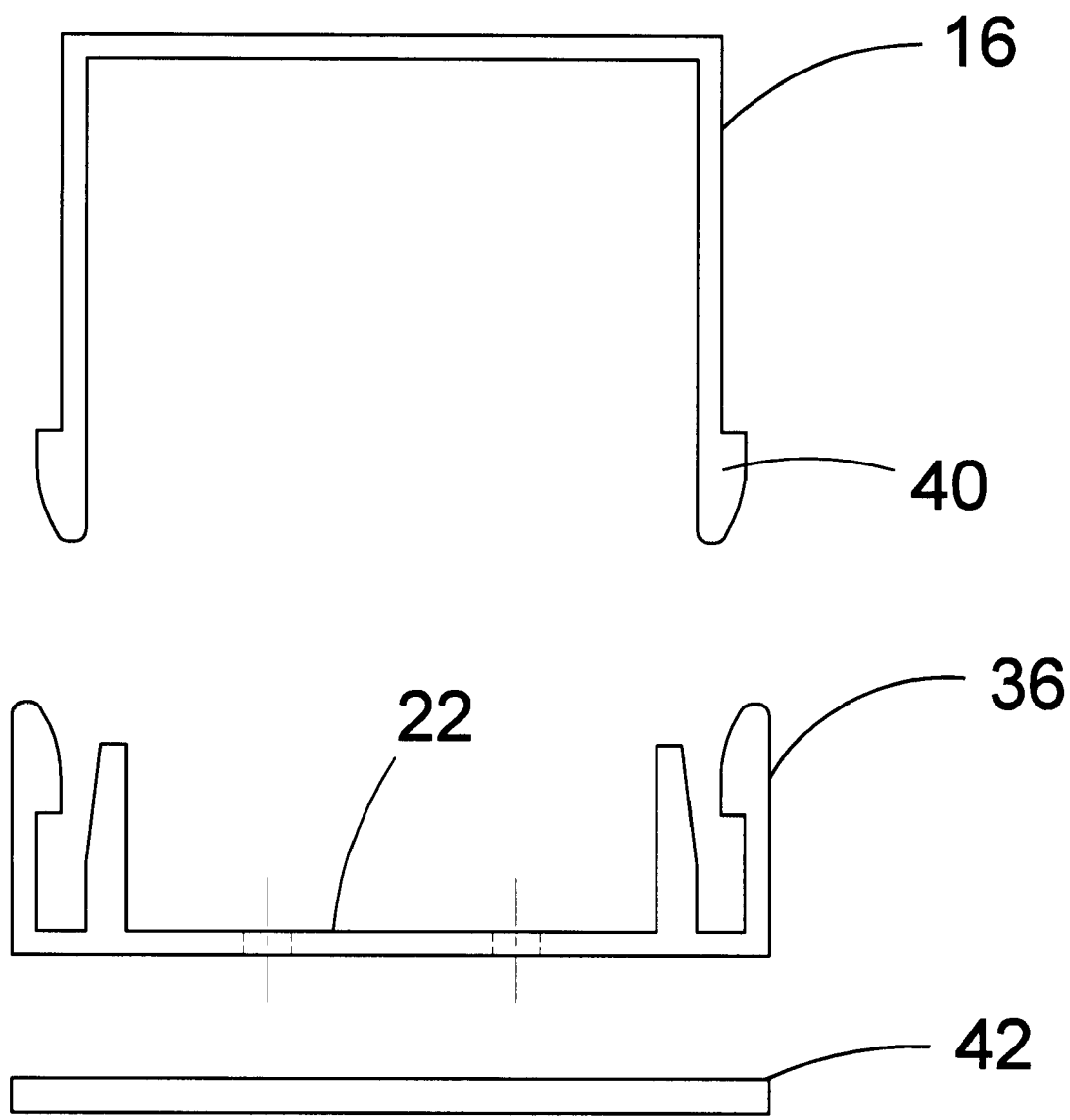
FIG. 7A is a top view of a channel and an alternate channel holding member having an adhesive backing member. Also shown is a channel member having clip-engaging means for securing the channel member to the clip-fastening member.

Turning to FIG. 7A, shown therein is a top view of a channel 16 and an alternate channel holding member 22 having an adhesive backing member 42. Also shown is a channel member 16 having clip-engaging means 40 for securing the channel member 16 to the clip-fastening member 36.

Figure 7B:
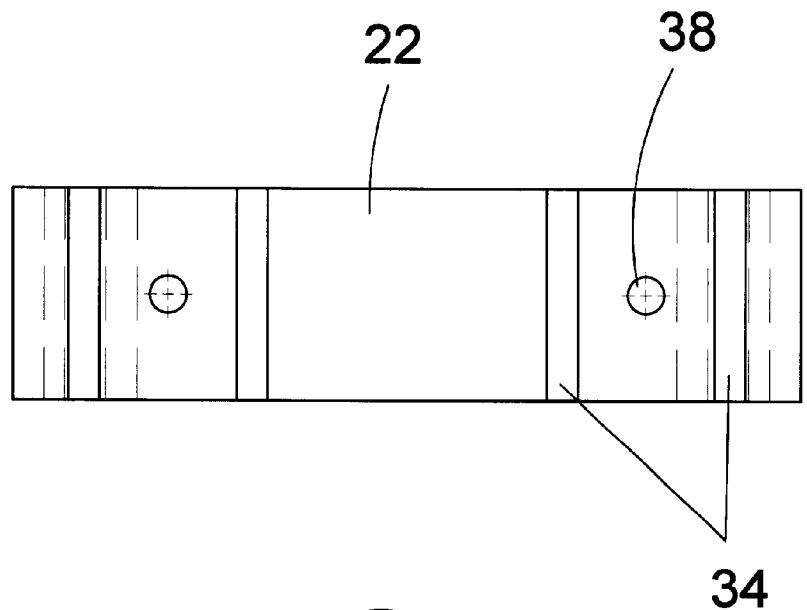
FIG. 7B is a rear view of a channel holding clip showing the standoff members and fastening apertures for affixing said channel-holding clip to a structure.

Turning to FIG. 7B, shown therein is a rear view of a channel holding clip 22 showing the standoff members 34 and fastening apertures 38 for affixing the channel holding clip 22 to a structure.

Figure 7C:
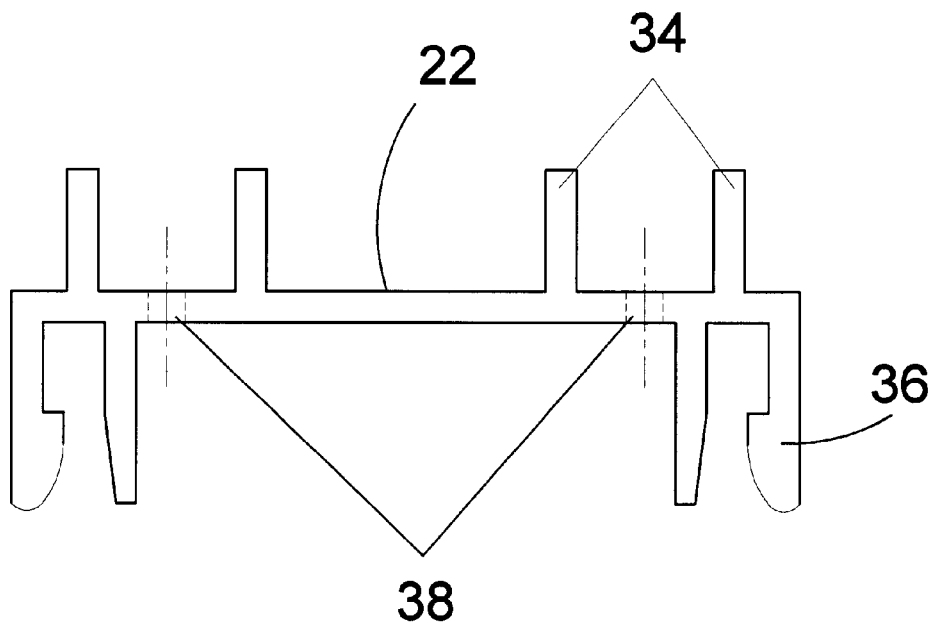
FIG. 7C is a top view of a channel holding clip showing the standoff members, the clip engaging means for securing the channel member to the clip fastening member, and shown in hidden line are fastening apertures for affixing said channel holding clip to a structure.

Turning to FIG. 7C, shown therein is a top view of a channel holding clip 22 showing the standoff members 34, the clip engaging means 36 for securing the channel member to the clip fastening member. Shown in hidden line are fastening apertures 38 for affixing the channel holding clip 22 to a structure.

Figure 8:
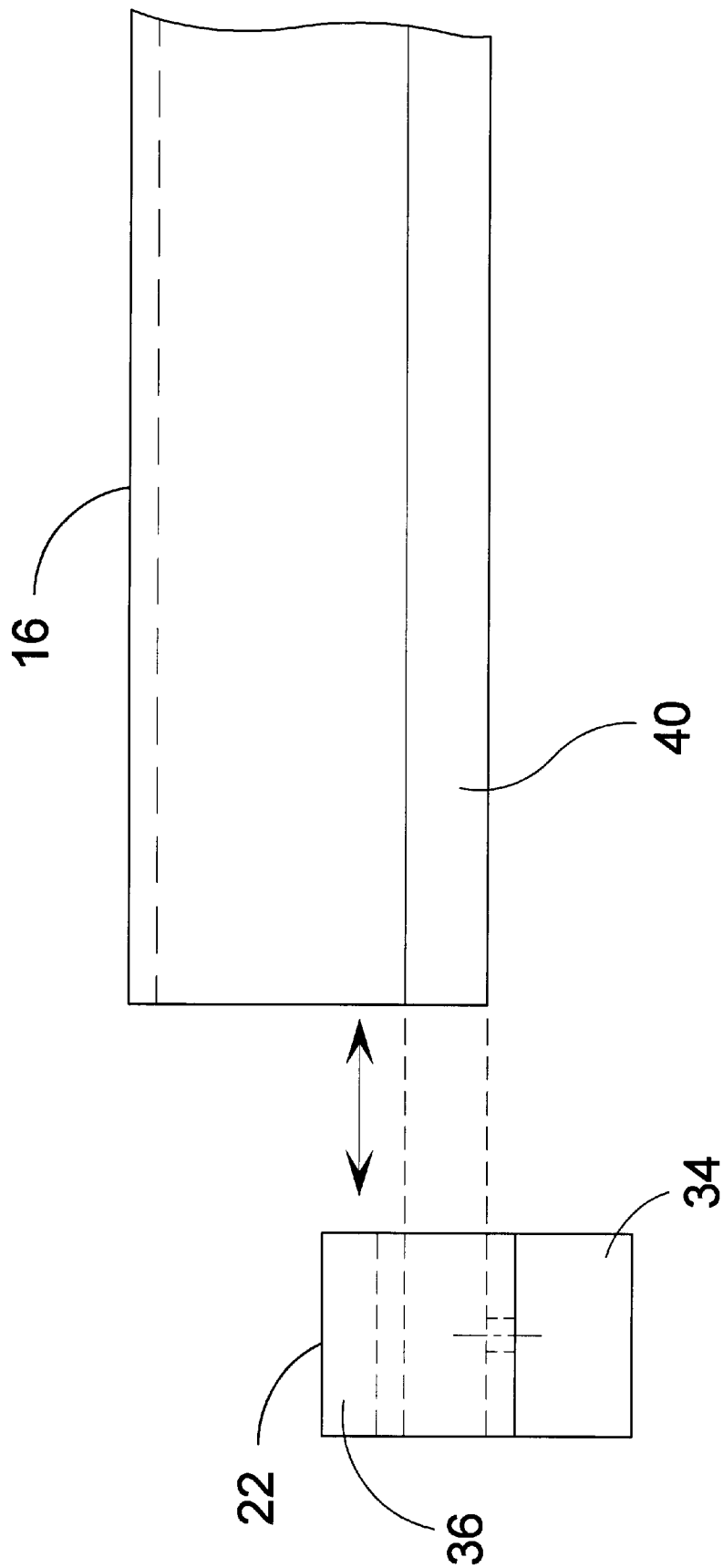
FIG. 8 is a side view, taken from FIG. 3 as indicated. Shown is a channel holding member having standoff members and clip leg members. Also shown is a channel member having clip-engaging means for securing the channel member to the clip-fastening member.

Turning go FIG. 8, shown therein is a side view, taken from FIG. 3 as indicated. Shown is a channel holding member 22 having standoff members 34 and clip leg members 36. Also shown is a channel member 16 having clip-engaging means 40 for securing the channel member 16 to the clip-fastening member 22.

Figure 9:
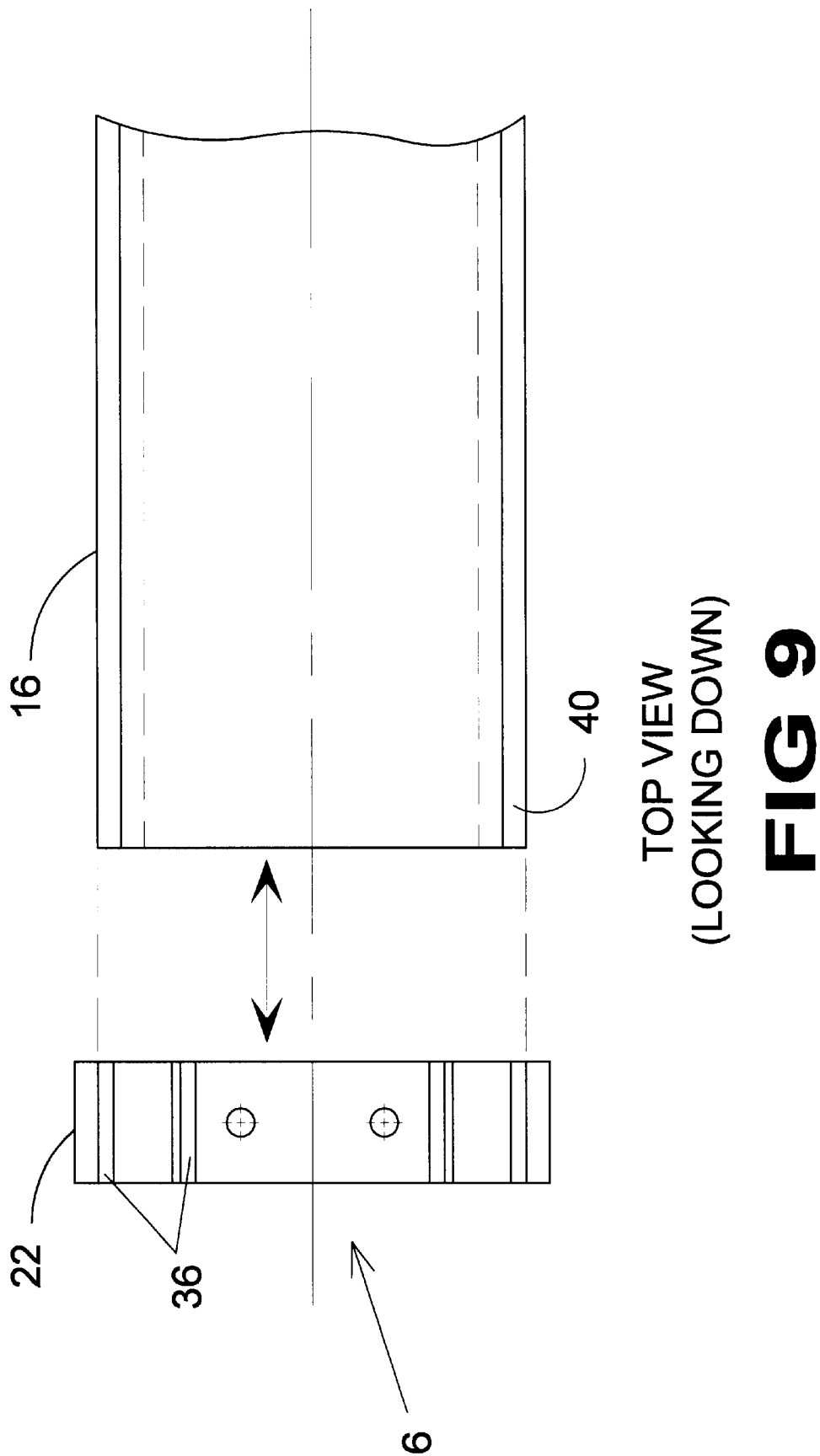
FIG. 9 is a top view, taken from FIG. 3 as indicated. Shown is a channel holding member having standoff members, not shown, and clip leg members. Also shown is a channel member having clip-engaging means for holding the channel member to the clip-fastening member.

Turning to FIG. 9, shown therein is a top view, taken from FIG. 3 as indicated. Shown is a channel holding member 22 having standoff members 34 (not shown) and clip leg members 36. Also shown is a channel member 16 having clip-engaging means 40 for holding the channel member 16 to the clip-fastening member 22.

Figure 10:
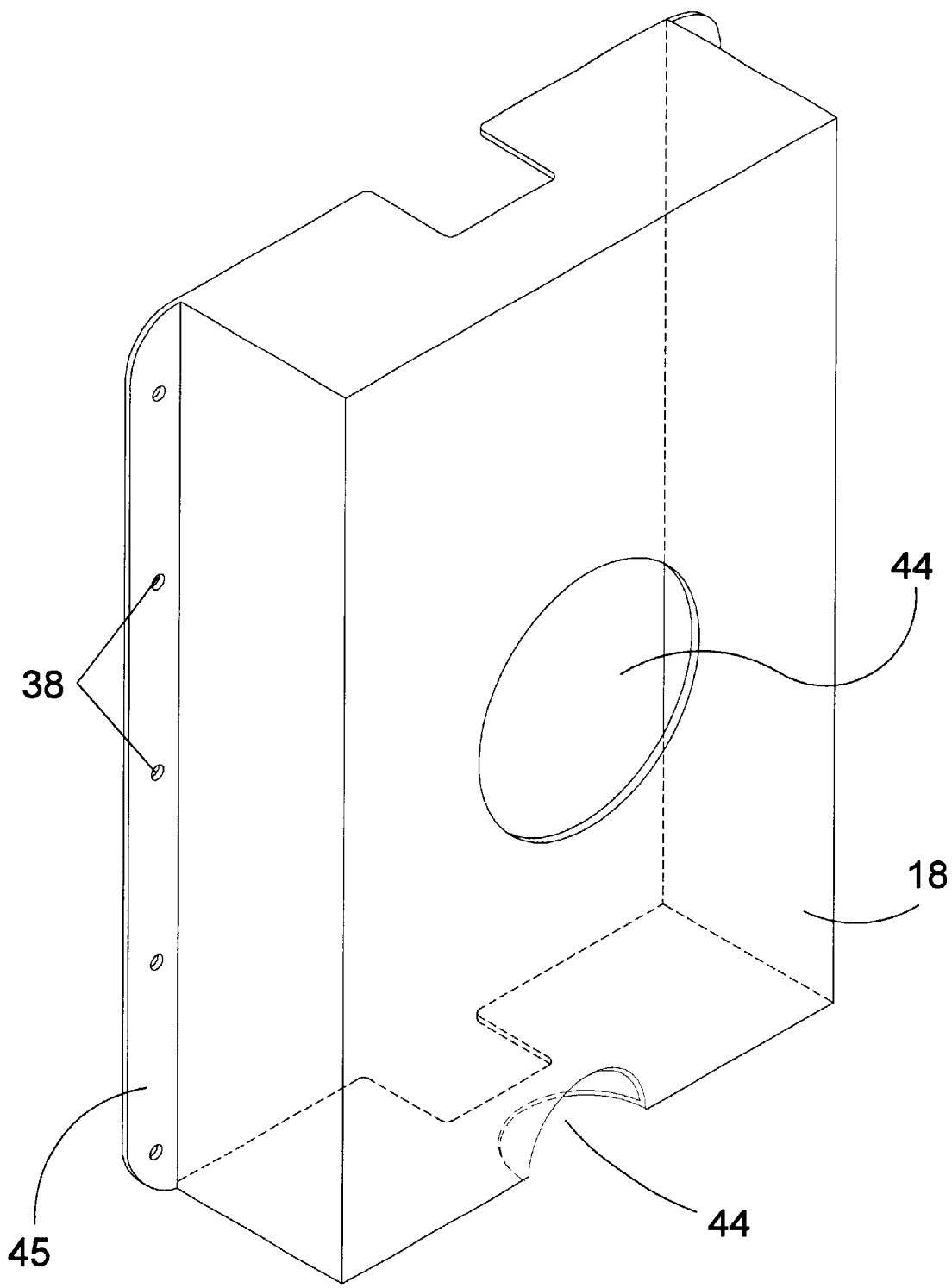
FIG. 10 is a perspective view, taken from FIG. 3 as indicated, showing the electric meter cover. The electric meter cover has a flange having fastener apertures for affixing to the structure as well as, an apertures for viewing the electric meter and the tamper indicator lock.

Turning to FIG. 10, shown therein a perspective view, taken from FIG. 3 as indicated, showing the electric meter cover 18. The electric meter cover 18 has a flange 45 having multiple fastener apertures 38 for affixing to the structure as well as, a larger viewing aperture 44 for viewing the electric meter and the tamper indicator lock.

Figure 11:
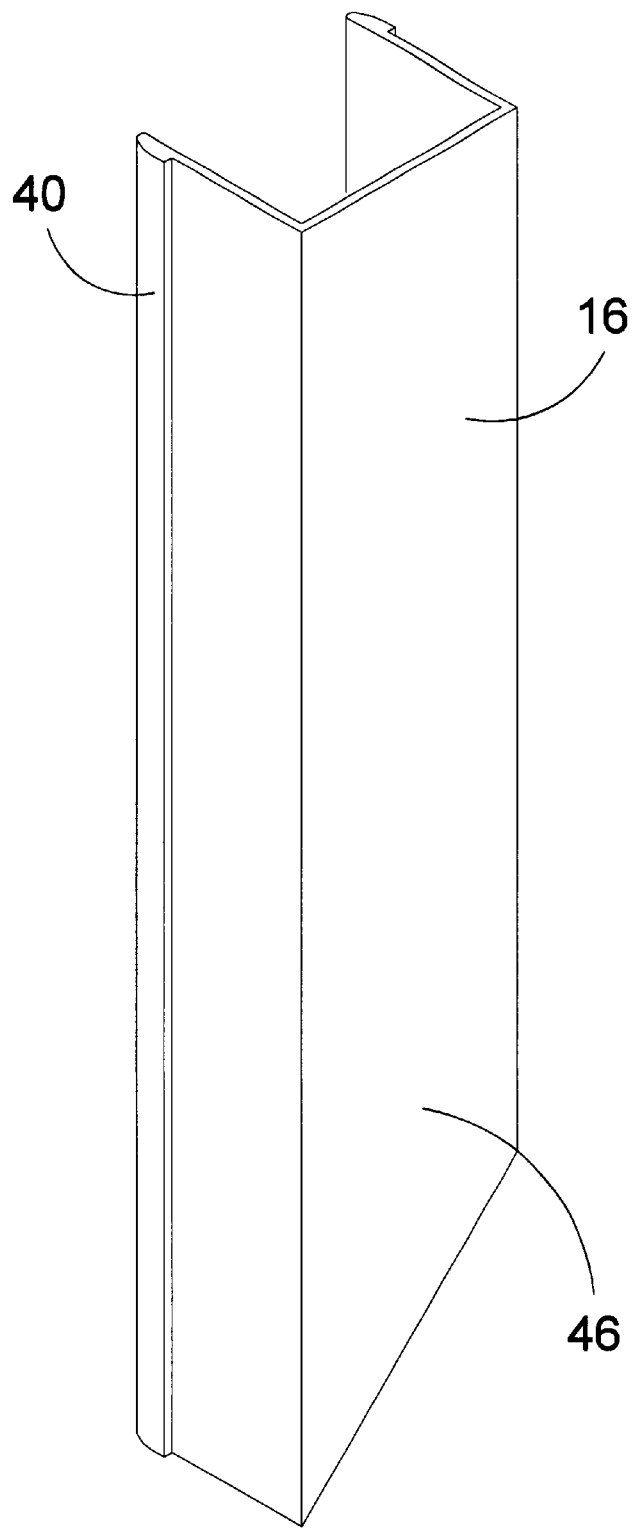
FIG. 11 is a perspective view, taken from FIG. 3 as indicated. Shown is a channel member having clip-engaging means for holding the channel member to the clip-fastening member. Also shown is an angular distal end whereby the channel run can conform to any angular changes of the cable or conduit raceway.

Turning to FIG. 11, shown therein is a perspective view, taken from FIG. 3 as indicated. Shown is a channel member 16 having clip engaging means 40 for holding the channel member 16 to the clip fastening member. Also shown is an angular distal end 46 whereby the channel run can conform to any angular changes of the cable or conduit raceway.

Figure 12:
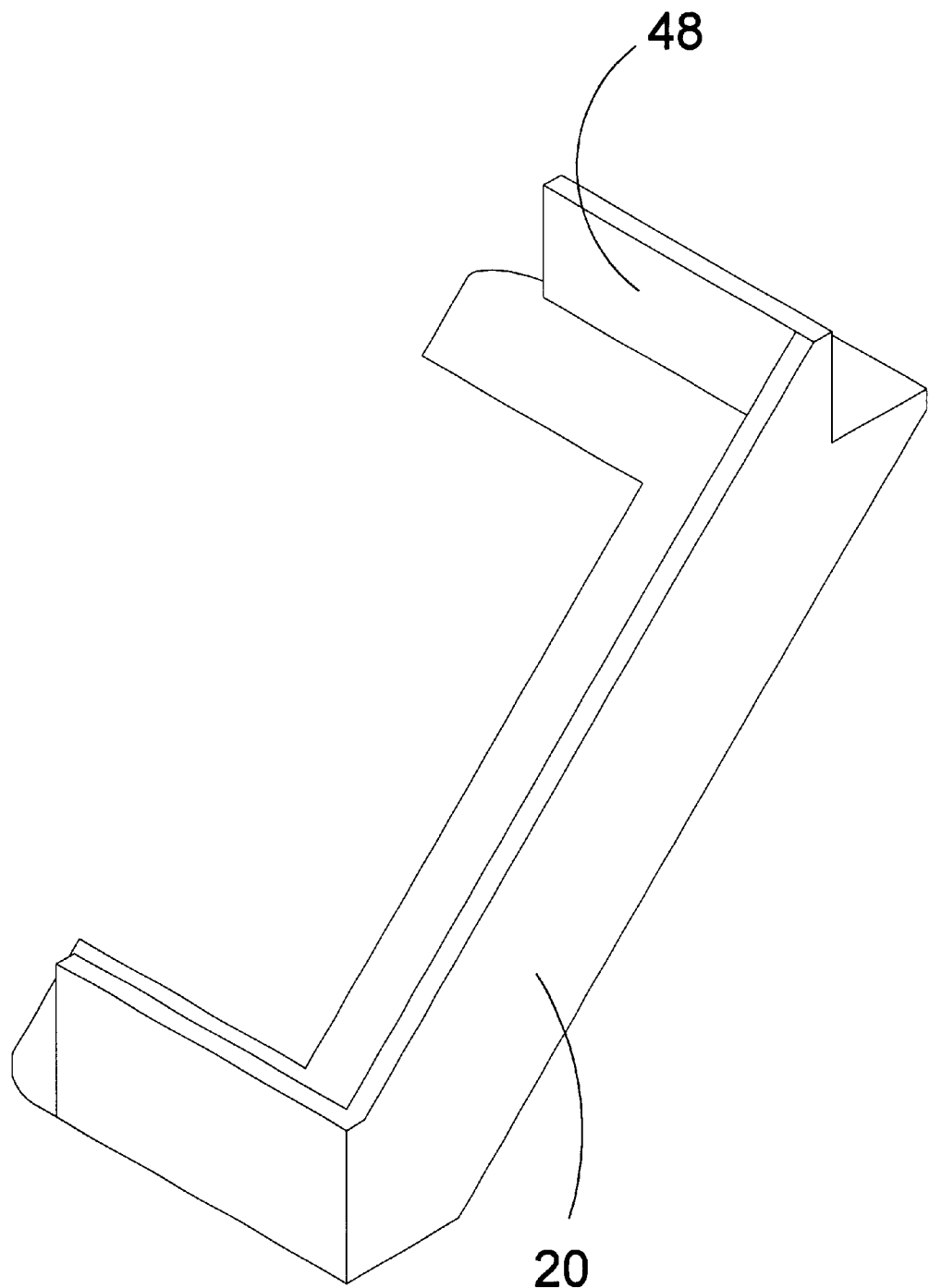
FIG. 12 is a perspective view, taken from FIG. 3 as indicated. Shown is an angular conduit-joining member providing means for sealing joining angular conduit members, as well as, providing rigidity to said joining.

Turning to FIG. 12, shown therein is a perspective view, taken from FIG. 3 as indicated. Shown is an angular conduit-joining member 20 providing means for sealingly joining 48 angular conduit members 16, as well as, providing rigidity to the joint.

Figure 13:
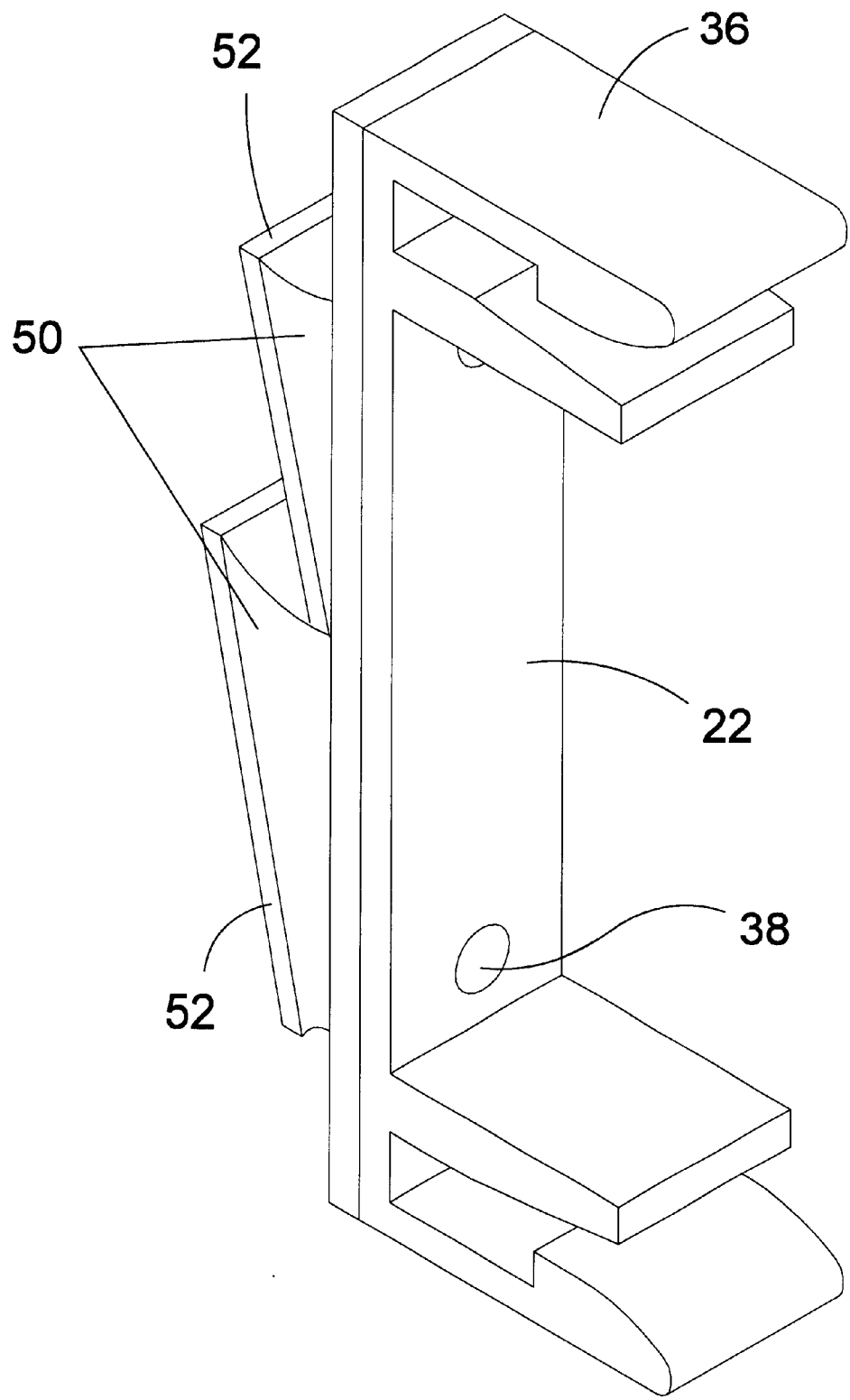
FIG. 13 is a perspective view, taken from FIG. 3 as indicated. Shown is a channel holding member having a stepped angular siding engaging surface conforming to the angular configuration formed after joining two siding members. Further said brackets stepped angular siding engaging surface has a layer of adhesive and fastening apertures providing additional means for attaching said channel holding member to a structure. Also shown are clip leg members providing means for securing channel members to the channel holding members.

Turning to FIG. 13, shown therein is a perspective view, taken from FIG. 3 as indicated. Shown is a channel holding member 22 having a stepped angular siding engaging surface 50 conforming to the angular configuration formed after joining two overlapping siding members 14 (not shown). The stepped angular siding engaging surface 50 of the bracket has a layer of adhesive 52 and fastening apertures 38 therein providing additional means for attaching the channel holding member 22 to a structure. Also shown are clip leg members 36 providing means for securing channel members to the channel holding members 22.

Figure 14:
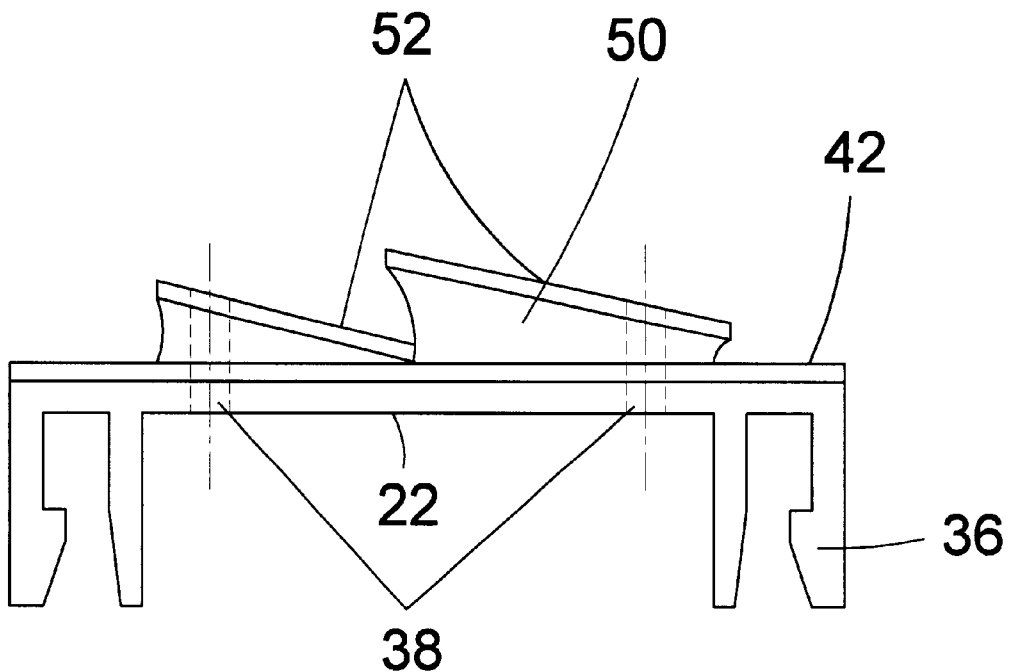
FIG. 14 is a side view, taken from FIG. 3 as indicated. Shown is a channel holding member having an angular stepped siding engaging surface conforming to the angular configuration formed after joining two siding slat members. Further said holding members angular stepped siding engaging surface has a layer of adhesive and fastener apertures providing additional means for attaching said channel holding member to a structure. Also shown are clip leg members providing means for securing channel members to the channel holding members.

Turning to FIG. 14, shown therein is a side view, taken from FIG. 3 as indicated. Shown is a channel holding member 22 having an angular stepped siding engaging surface 50 conforming to the angular configuration formed after joining two overlapping siding slat members. Further said holding members angular stepped siding engaging surface 50 has a layer of adhesive 52 and fastener apertures 38 providing additional means for attaching the channel holding member 22 to a structure. Also shown are clip leg members 36 providing means for securing channel members to the channel holding members 22.

Figure 14A:
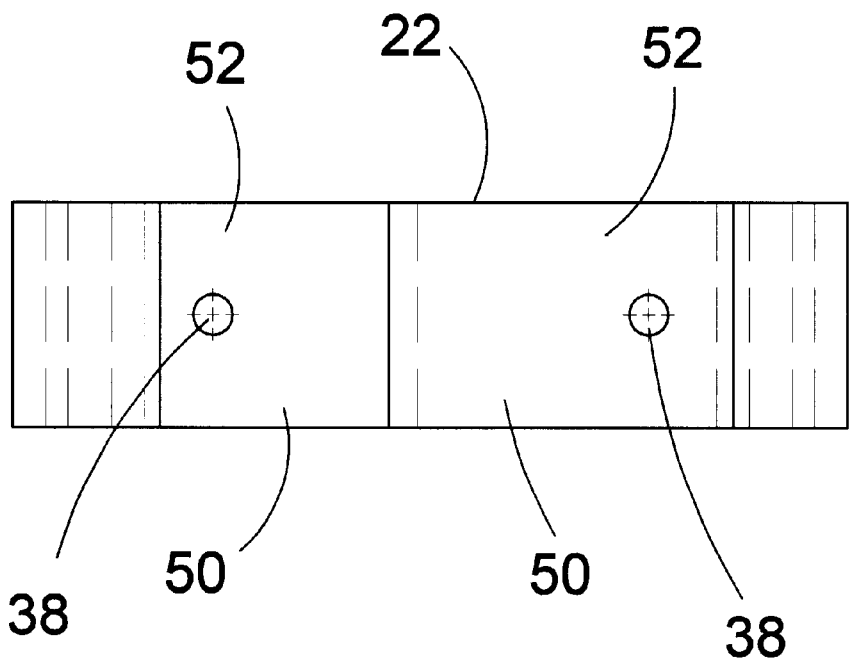
FIG. 14A is a top view, taken from FIG. 3 as indicated. Shown is a bracket holding member having an angular stepped siding engaging surface conforming to the angular configuration formed after joining two siding slat members. Further said holding members angular stepped siding engaging surface has a layer of adhesive and fastener apertures providing additional means of securing said bracket to a structure.

Turning to FIG. 14A is a top view, taken from FIG. 3 as indicated. Shown is a bracket holding member 22 having an angular stepped siding engaging surface 50 conforming to the angular configuration formed after joining two siding slat members. Further the holding members angular stepped siding engaging surface 50 has a layer of adhesive 52 and fastener apertures 38 providing additional means of securing the bracket 22 to a structure.

Figure 15:
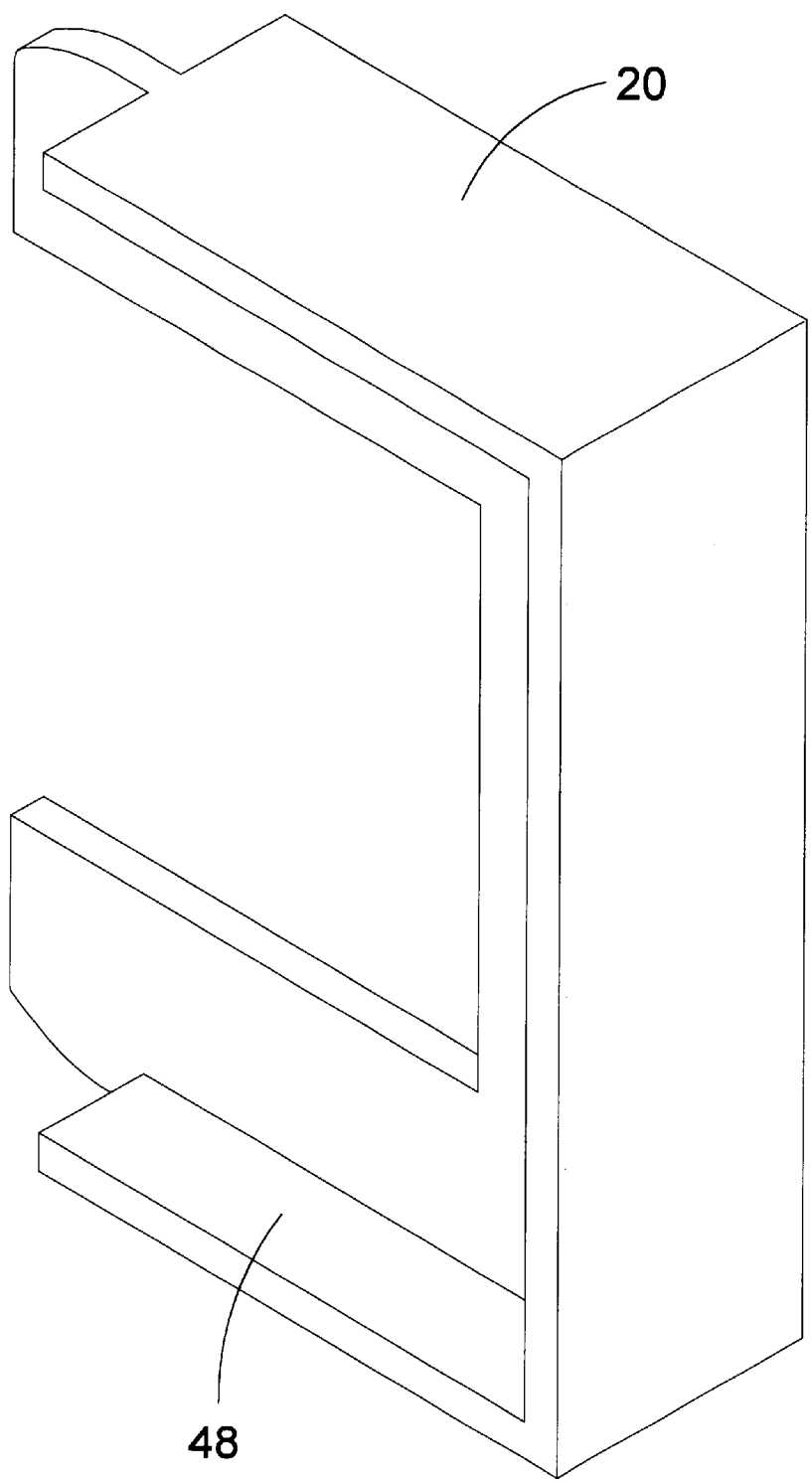
FIG. 15 is a perspective view, taken from FIG. 3 as indicated. Shown is an conduit-joining member providing means for sealing joining conduit members, as well as, providing rigidity to said joining.

Turning to FIG. 15, shown therein is a perspective view, taken from FIG. 3 as indicated. Shown is a conduit joining member 20 providing means for sealingly joining 48 conduit members, as well as, providing rigidity to the joint.

What is claimed to be new and desired to be protected by Letters Patent is set forth in the appended claims:

1. An apparatus to decoratively cover electrical wiring or conduit on the exterior surface of a building, comprising:
   a) a plurality of U-shaped channel members for decoratively covering electrical wiring or conduit;
   b) a U-shaped means for connecting said U-shaped channel members to each other;
   c) a U-shaped means for attaching said U-shaped channel members to the exterior surface of a building;
   d) an electrical meter cover having a means for attachment to the exterior surface of a building surface; and
   e) said U-shaped means for attaching said U-shaped channel members to the building further comprising a U-shaped bracket having standoff means from the building disposed on a first side.

2. The apparatus of claim 1, further comprising a top cap.

3. The apparatus of claim 2, wherein said top cap has a pyramid shape.

4. The apparatus of claim 3, wherein said top cap further comprises means for closure around the electrical cable or conduit.

5. The apparatus of claim 1, further comprising an end cap.

6. The apparatus of claim 5, wherein said end cap further comprises means for closure around the electrical cable or conduit.

7. The apparatus of claim 1, wherein said U-shaped means for connecting said U-shaped channel members further comprises a joint which is sealed and rigid.

8. The apparatus of claim 1, further comprising a pair of clips on said U-shaped bracket disposed on a second side for receiving said U-shaped channel members.

9. The apparatus of claim 8, wherein said pair of clips are for receiving a pair of clip engaging means disposed on said U-shaped channel members whereby said U-shaped channel members are removably fixedly attached to said U-shaped bracket.

10. The apparatus of claim 9, further comprising mating shoulders disposed on said pair of clips and said clip engaging means.

11. The apparatus of claim 1, wherein said U-shaped means for attaching have multiple apertures therein for receiving fasteners whereby said U-shaped means for attaching is fastened to the exterior surface of a building.

12. The apparatus of claim 1, wherein said U-shaped means for attaching have adhesive pads thereon whereby said U-shaped means for attaching is fastened to the exterior surface of a building.

13. The apparatus of claim 1, wherein said U-shaped means for attaching said U-shaped bracket having a stepped siding engaging means whereby said U-shaped bracket can be attached to a building having overlapping siding thereon.

14. The apparatus of claim 1, wherein said U-shaped means for attaching have multiple apertures therein for receiving fasteners whereby said U-shaped means for attaching is fastened to the exterior surface of a building.

15. The apparatus of claim 1, wherein said U-shaped channel members further comprise angular ends for conformance to angular variations in lengths of electrical wiring or conduit.

* * * * *